United States Patent [19]

Rabenhorst

[11] 4,023,437
[45] May 17, 1977

[54] FILAMENT ROTOR HAVING ELASTIC SHEATHS COVERING THE FILAMENTARY ELEMENTS OF THE STRUCTURE

[75] Inventor: David W. Rabenhorst, Clarksville, Md.

[73] Assignee: The Johns Hopkins University, Baltimore, Md.

[22] Filed: Oct. 24, 1975

[21] Appl. No.: 625,582

[52] U.S. Cl. ................................................ 74/572
[51] Int. Cl.² ........................................ F16C 15/00
[58] Field of Search ..................................... 74/572

[56] References Cited

UNITED STATES PATENTS

| 3,296,886 | 1/1967 | Reinhart, Jr. ........................ 74/572 |
| 3,683,216 | 8/1972 | Post ................................. 74/572 X |
| 3,859,868 | 1/1975 | Post ................................... 74/572 |

FOREIGN PATENTS OR APPLICATIONS

| 61,717 | 6/1913 | Austria ................................ 74/572 |

Primary Examiner—Samuel Scott
Assistant Examiner—Randall Heald
Attorney, Agent, or Firm—Robert E. Archibald; Kenneth E. Darnell

[57] ABSTRACT

The invention generally relates to inertial energy storage devices formed of wound anisotropic material. In particular, the invention provides a disc-like flywheel formed of windings of anisotropic filaments wherein the filaments are provided with a relatively thin sheath of flexible material around each of the filaments, the flexible sheath providing positive contact between adjacent windings even during deformation of the windings caused by rotation of the structure.

13 Claims, 7 Drawing Figures

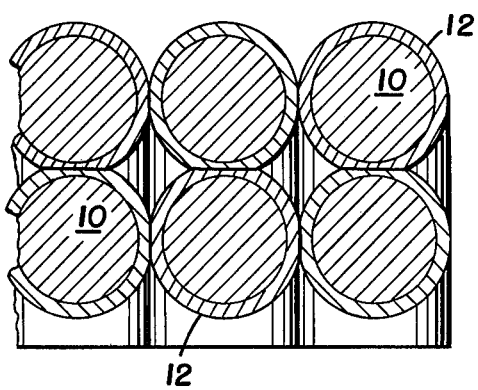
FIG. 1
FIG. 2
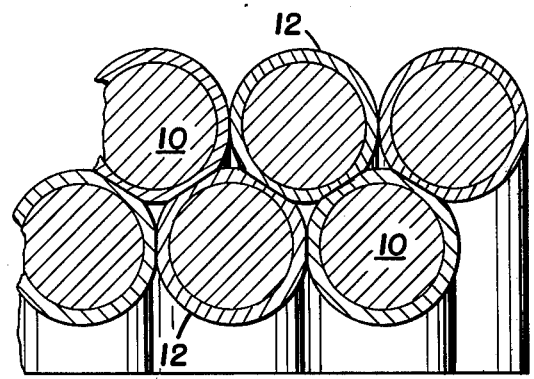
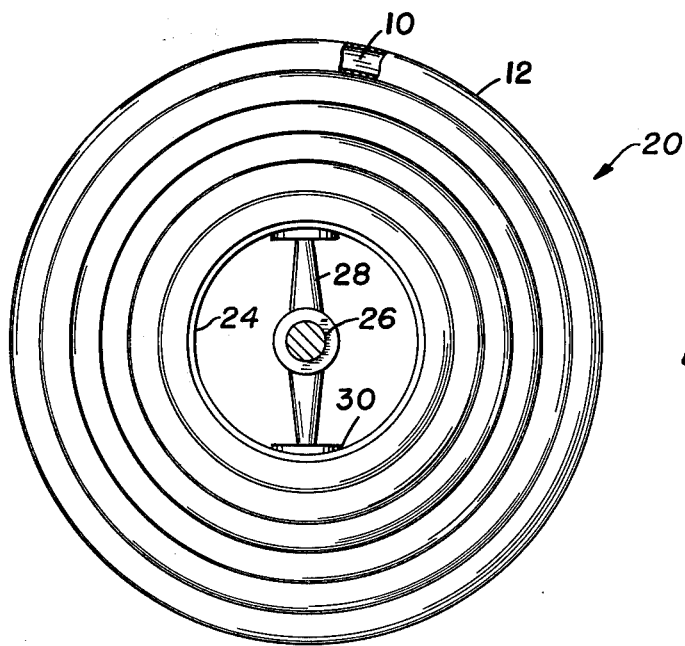
FIG. 3

FILAMENT ROTOR HAVING ELASTIC SHEATHS COVERING THE FILAMENTARY ELEMENTS OF THE STRUCTURE

STATEMENT OF GOVERNMENTAL INTEREST

The invention herein described was made in the course of or under a contract or subcontract thereunder, with the Department of the Navy.

BACKGROUND OF THE INVENTION

During the past several years a new flywheel technology has evolved which has resulted in a several-fold improvement in the energy density of flywheel structures while at the same time offering major advances in safety and economy. These improvements are for the most part brought about by the employment of anisotropic, filamentary materials such as carbon, fiberglass fibers, or a new DuPont fiber known as Kevlar, all having strength-to-density properties significantly greater than the best practical steel. In addition, the filamentary composition of such materials is of significant importance in flywheel application, since it is this property which enables the flywheel to be more readily designed for failure containment than solid steel flywheel structures previously proposed.

More particularly, it has previously been proposed that improved flywheels can be constructed in the form of wound disc structures with either fiberglass or steel foil as the principal structural material, such structures being described in detail in a Russian book entitled, "Inertial Energy Accumulators", by N. V. Gulia, Voronez. University Press, Voronezh, 1973. Unfortunately, such structures have had only limited success due to the hub attachment difficulty usually found with this type of structure. In an effort to overcome the hub attachment problem associated with wound disc flywheel structures, I previously proposed a circular brush flywheel configuration which utilizes radially oriented fibers or rods, such as are disclosed in my U.S. Pat. Nos. 3,698,262 and 3,737,694. On the other hand, for certain flywheel applications, it would be advantageous to have an alternative flywheel configuration which, at least in theory, appears capable of storing more energy per unit volume than this circular brush configuration, and at a reduced rotational speed or rpm for a given energy level.

The principal reason that previous attempts to build filament-wound flywheels have met with only limited success is the fact that the stress on the wound filaments varies as the square of the distance of the filaments from the center of rotation. Since the amount that the filament stretches is proportional to the stress, the filament thus also stretches in proportion to the square of its radius of rotation. In addition, the amount of stretch varies in proportion to the change in length of successive rings, this change varying directly with the diameter. Although the percentage stretch relative to ring circumference is the same for any ring, the percentage stretch increases with respect to the fixed filament cross section diameter. Thus, the total amount of radial stress actually varies with the cube of the radius. In a wound rotor having an inside radius of one-third its outside radius, the outside filaments would stretch 27 times as much as the filaments on the inside. The differential stretch between adjacent rings at these respective locations would be similarly affected. In this situation, as has been demonstrated many times in past experiments, the filament-wound flywheel breaks into many concentric rings long before the filaments have reached their breaking stress. This, of course, is true if there are no extra radial filaments in the flywheel structure to take the radial loads. On the other hand, if such extra filaments are added, then the weight of these filaments must be taken into consideration when determining the energy density of the structure. This simple paradox accounts for the lack of success of the filament-wound and multi-rim fly-wheels previously attempted; performance typically being a fraction of theoretical.

One previously proposed manner of accommodating the differential stretching of the filamentary materials is to provide an elastomer matrix which acts as a spacer between the rings or filaments of a multi-ring flywheel. However, it is not clear that the elastomer can withstand the high acceleration forces occurring during flywheel operation, and at the same time provide the required stretch capabilites in some direction while also providing the required stiffness in other directions. Moreover, the elastomer matrix will occupy about 30% as much space as the working filaments and thereby degrade volume, weight and cost.

SUMMARY OF THE INVENTION

In order to overcome the deficiencies of the prior art and realize more fully the advantages of rim and disc-type, wound filament flywheel configurations, it is proposed in accordance with the present invention that the multiple rings, filament windings, or composite rod windings constituting the rim portion of the flywheel be coated or sheathed with a layer of resilient or flexible material. A flywheel configured according to the present invention would require no matrix material between the rings or wound elements, the individual rings or windings being thereby allowed to expand more freely. An effective ring volume, weight and cost is thereby achieved.

In accordance with the present invention, the proposed flywheel structure allows use of bare filament members, (such as wire, nylon, or Kevlar) which is particularly important in applications employing relatively small size flywheels wherein the filament-wound structure can satisfactorily hold its wound shape under gravity forces without damage when not operating. It is also contemplated that, in order to reduce the size and cost of the overall flywheel structure, an inexpensive ballast material can be utilized particularly in the inner rings of the ring structure, as will be explained hereinafter, since the stress in the individual ring is a function of the square of that ring's radius, and therefore all rings except the outermost are operating below their maximum stress capability, hence below their maximum energy capability.

In view of the foregoing, one object of the present invention is to provide an inproved filament wound or discrete ring flywheel structure wherein the filament windings are covered or sheathed with a thin layer of axially deformable elastomeric material.

A further object of the present invention is to provide a filament wound or discrete ring flywheel structure wherein no matrix material is employed between the rings or windings constituting the rim portion of the structure.

A further object of the present invention is to provide a rotary energy storage device or flywheel which utilizes anisotropic filamentary materials and which possesses substantial energy per unit volume and per unit weight.

A further object of the present invention is to provide a rotary energy storage device or flywheel having substantial energy per unit volume and weight, at reduced cost and increased safety.

Other objects, purposes and characteristic features of the present invention will in part be pointed out in light of the following descripion of the preferred embodiments.

BRIEF DESCRIPTION OF THE DRAWINGS

FIG. 1 is an idealized cross-section of a plurality of filaments formed according to the invention and arranged within a flywheel structure in flat layers;

FIG. 2 is an idealized cross-section of a plurality of filaments formed according to the invention and arranged within a flywheel structure in interdigitated layers;

FIG. 3 is a top planar view of a rim-type flywheel formed of anisotropic filaments according to the invention;

DESCRIPTION OF THE PREFERRED EMBODIMENTS

Figure 4:
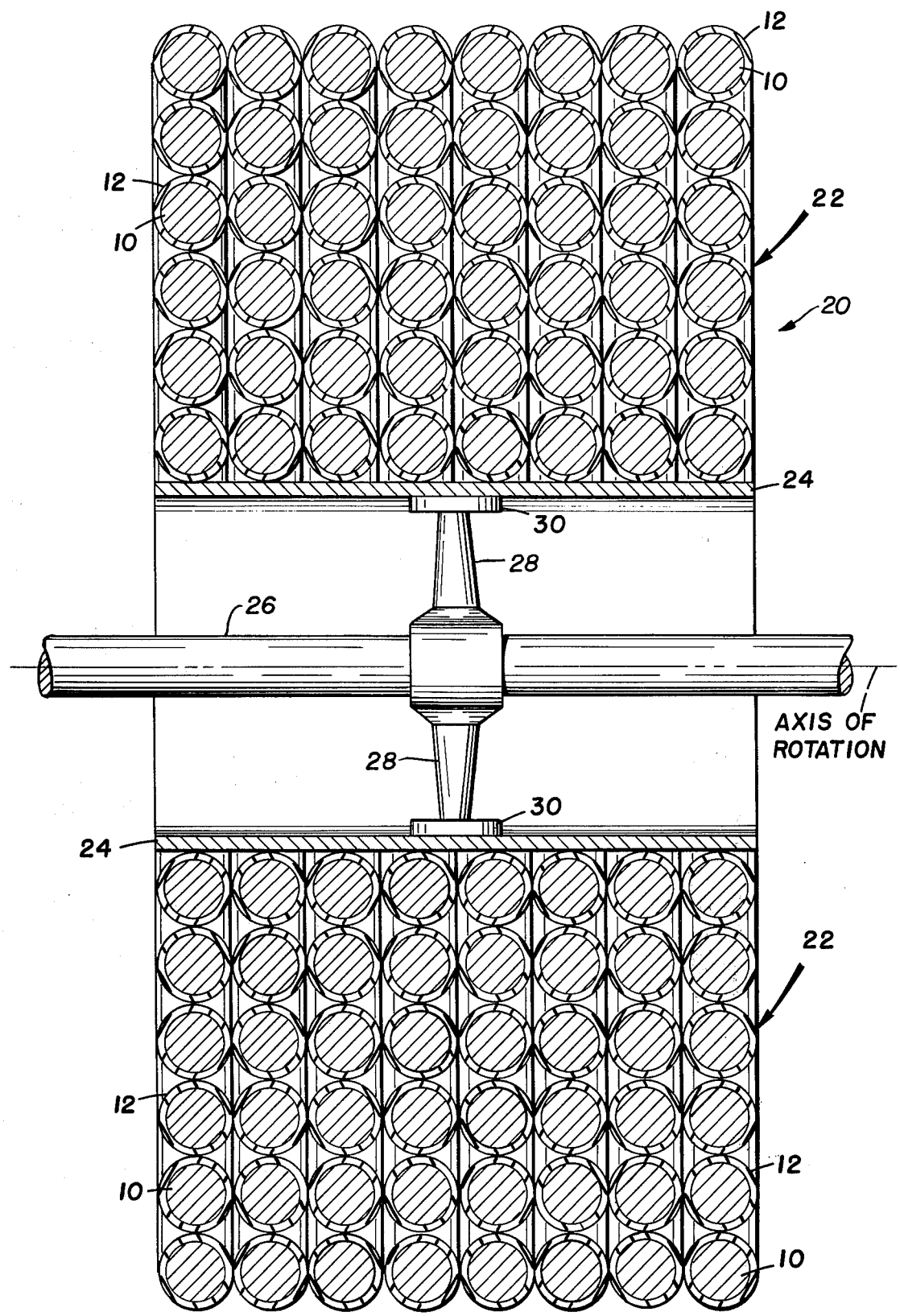
FIG. 4 is an elevation in partial section of the structure shown in FIG. 3.

It is proposed in accordance with the present invention to provide an improved filament wound flywheel structure wherein the rim or disc portion is comprised of multiple rings or filament windings of high tensile strength, anisotropic materials, such as carbon or fiberglass fibers, having strength to density ratios many times greater than the best practical steels previously proposed for use in flywheel applications. As noted earlier, a further fiber material from which the multiple rings or filamentary windings can be formed for the rim portion of the proposed flywheel of the present invention is a new fiber marketed by DuPont under the trade name Kevlar which has a tensile strength, for the unidirectional composite, of 250,000 psi and a denstiy of 0.05 lb per cubic inch; the tensile strength of the bare elements having been measured at over 500,000 psi. This fiber is currently being used as a structural material in a wide variety of components in most of the major aircraft manufactured in the United States today. It does not suffer appreciably from the static fatigue problems usually associated with fibergass; it is often used at a very high percentage of its tensile strength; and, its strength -to- density and modulus of elasticity are both considerably higher than glass.

The present invention further provides that each of the multiple rings or filament windings comprising the rim portion or disc portion of the flywheel be coated, covered, or otherwise provided with a thin coating, covering, or sheath of a flexible or resilient elastomeric material. Since the differential expansion between similar adjacent rings of a discrete ring or filament wound flywheel is proportional to the ring (or winding, thickness (or diameter), only a very small amount of elastomer material is required to maintain contact between adjacent layers of rings or windings during the expansion of the flywheel structure caused by rotation of the structure. This physical situation is due to the fact that the actual diameters of typical filamentary materials are very small relative to the diameter of the structure itself. Thus, structural continuity between the rings or windings during flywheel expansion can be preserved by the simple disposition on each filamentary ring or winding of a very thin flexible sheath of elastomeric material. This continuity should be adequate for a flywheel installations exposed to a moderate environment, such as a wide variety of static electric energy storage systems. The elastomeric sheath can make up less than 3% of the total material comprising the rim of disc portion of the structure, compared with about 30% for prior art elastomeric ring flywheels. The substantial savings in cost thus afforded are derived not only from the great reduction of essentially non-energy-storing material, but also by virtue of the fact that the entire structure can be produced by simple, automatic winding machinery.

Referring now to FIG. 1 of the drawings, a plurality of filaments 10 are seen in section to be covered with flexible sheaths 12 formed onto the filaments 10. The sheaths 12 are preferably comprised of an elastomeric material. However, any material which is resiliently deformable without permanent set in an axial direction, i.e., relative to the transverse axis of the filament 10, proves suitable for use in the invention. FIG. 1 particularly shows one method for disposing the filaments 10 relative to each other within a flywheel structure. As shown, the filaments 10 are formed into flat layers with the filaments being aligned with filaments in adjacent layers. It is to be understood that the filaments 10 can comprise discrete annular rings or filament windings shaving their geometrical centers lying along an axis of rotation. In either event, the filaments 10 are compressed together during fabrication of the structure such that the resilient sheaths 12 are deformed transverse to the filament axis. Rotation of the fly-wheel and its filaments 10 about an axis of rotation causes the filaments 10 to expand radially from the axis. However, the filaments 10 will maintain mutual contact during this expansion since the resilient sheaths 12 will locally expand radially back toward their non-compressed configurations.

Referring to FIG. 2, it is to be seen that the filaments 10 have sheaths 12 as described relative to FIG. 1. However, the layers of the filaments 10 are offset or interdigitated in order to provide a greater density of filaments within the flywheel structure.

FIGS. 3 and 4 illustrate a flywheel rotor 20 of the rim-type wherein a plurality of the filaments 10 clad with resilient sheaths 12 are wound or otherwise disposed within the structure to form a rim member 22. The rim member 22 can be formed as shown in either FIG. 1 or FIG. 2. The rim member 22 is fitted onto a metal hub member 24, the hub member 24 being joined to a rotary shaft 26 by means of a spoke member 28. The spoke member 28 has a central hole formed centrally therein to receive the shaft 26. The spoke member 28 further has enlarged attachment fittings 30 at either end for connection, e.g., by bonding, to inner surface portions of the hub member 24.

The filaments 10 can be formed of filamentary material such as will be described hereinafter and clad with the resilient sheaths 12. The clad filaments 10 can be either wound about a shaft or mandrel with the wound rim member 22 being attached to the shaft 26 in a variety of ways. Since the filaments 10 maintain mutual contact even during rotation, matrix material between the filaments 10 is not necessary. The rim member 22 can alternately be fitted onto a shaft having an outside diameter essentially equal to the inner diameter of the rim member 22.

As an example of the invention, a rotor 20 wound from Kevlar fiber, the fiber having a diameter of 0.0005 inch will have a maximum differential expansion away from the adjacent fiber of 0.0000275 at rotor break, and 0.00001925 at 70% of the ultimate tensile strength of the fiber. This expansion is equal to 19.25 micro inch, or 3.90% of the fiber diameter and could be accommodated by local deformations in a cross-wound spool construction, much the same as the production spool on which this material is delivered. Such a cross-wound structure is described in detail hereinafter.

Another filamentary material useful as an example of a situation varying greatly from the above-noted example is fiber-glass formed into rods having a diameter of 0.042 inch and an elongation at break of 4.5 % (vs 2.75% for Kevlar). A rotor so wound from this material will have a maximum differential stretch between adjacent layers of 0.003793, or 9% of the wire diameter. At its rated stress of 50% UTS, the differential expansion would be 0.0018965, or 4.5% of the rod diameter. In the case of the bare Kevlar filament, a sheath 12 of flexible material less than 30 micro inch thick should be adequate to allow local deformation to occur while maintaining contact between the filaments 10. Fiberglass rods (0.042) require an elastomer sheath 12 of about 0.002 thickness to maintain adjacent layer contact upon expansion at rated speed. Rotor construction would entail simply winding this wire to the desired inner and outer diameter and providing suitable wire termintion as described hereinafter. No inter layer bonding is required. Present industrial capabilities can provide fiberglass wire having an elastomeric sheath 12 with a thickness as low as 0.0005.

As has previously been noted, individual discrete rings or individual filament windings can be utilized. The wound configurations can employ bare filaments, composite wires, or composite rods. These configurations could be made from materials such as fiberglass, metals, or carbon fibers. Typical of these configurations is a fiberglass manufactured by the Condex Corporation which has an apparent composite ultimate tensile strength in excess of 450,000 psi. This material is usually supplied as a composite wire having a cross-sectional diameter of 0.042. Reliable termination of this wire with a mechanical fitting is extremely difficult to accomplish at stress levels approaching the ultimate tensile strength of the wire (which, of course, is desirable for optimum performance of a flywheel made of this material). Large rotors could also require larger wire sizes, which would make wire termination even more difficult. The method of fabrication described relative to FIG. 5 alleviates this problem, and in many configurations, eliminates the termination problem completely.

Figure 5:
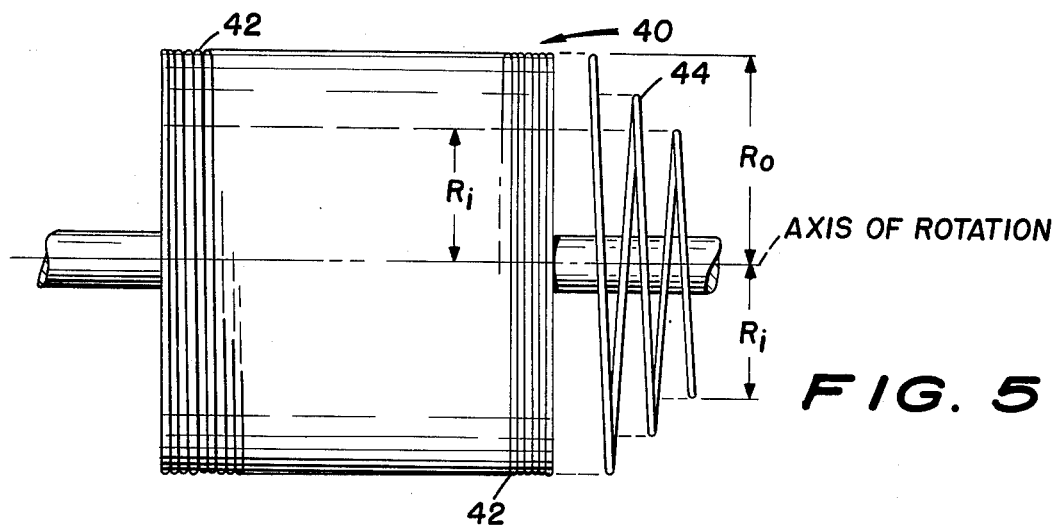
FIG. 5 is an idealized elevational view illustrating a structure formed by a particular method of winding the filaments.

Referring then to FIG. 5, a rim member 40 made from flexible sheath clad "fiberglass wire" windings 42 would normally be made by winding the disc to the desired size and shape (axial length) beginning at the inner winding and proceeding outwardly with succeeding level-wound layers. Now, terminating the inner end is no problem, since the maximum stress expected here will never be more than about ¼ of the stress at the outer winding at a particular RPM for the example given. However, when the conventional winding process is completed, the winding 42 would usually be terminated at the outer edge of the rim member 40. According to the present method, however, the rotor winding 42 begins at the inner periphery ($R_i$) of the member 40 and ends on the outer periphery ($R_o$). At this point $R_o$ the winding is continued for a single coil 44 inward to terminate on the inner periphery ($R_i$), where the stress is $R_i2/R_o$ times the stress at $R_o$ for a given rotational speed. The concept works equally well if the final inward winding 44 consisted of many coils, or even 50% of the main winding 42, but inward winding is considerably more difficult to achieve with automatic machinery, making a single inwardly wound coil the preferred arrangement.

The present rotor structures can be wound like a spool of thread using constant modulus and constant density with no matrix material being required between the windings. In fact, these structures can be wound without the use of spoke members or hub structures. As stated hereinabove, filamentary material can be wound directly onto a shift outwardly to a desired $R_o$. The energy/weight for such a configuration would only be 50% of optimum; that is, 50% of that of an infinitely thin ring; but, it would be about 75% of that of a similar flywheel having a practical $R_i/R_o$ ratio (i.e., 58%). Thus, if the filamentary material were steel hose wire wound directly on the shaft, it could have an energy/weight performance of about 7 watt hours per pound; whereas, if it had an $R_i = 58\%$ of $R_o$, and spokes and hub, it could have an energy/weight performance of about 9 watt hours per pound. At 45 cent per pound, the filamentary material in the shaft-wound rotor would cost $64 for a 1 kwh unit; whereas it would only be $50 for the spoke/hub unit. Clearly then, if the cost of the spokes and hub were more than the difference between these two ($14.), then it would be more economical to use the shaft-wound rotor over the spoke/hub rotor, even at the lower performance.

Figure 6:
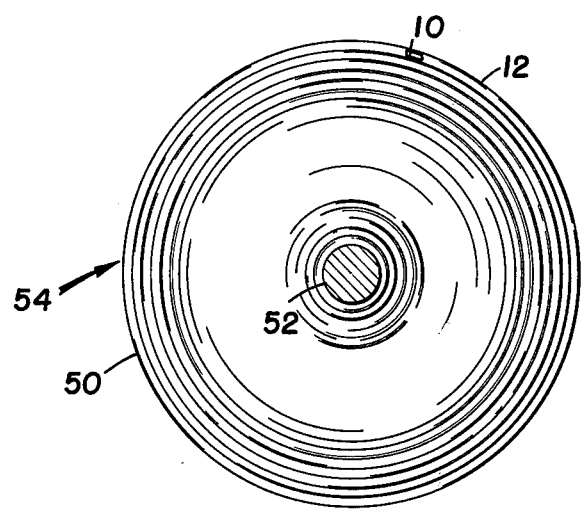
FIG. 6 is an idealized planar view of a structure formed by another method of winding the filaments; and, FIG. 7 is an elevational view of the structure shown in FIG. 6.
Figure 7:
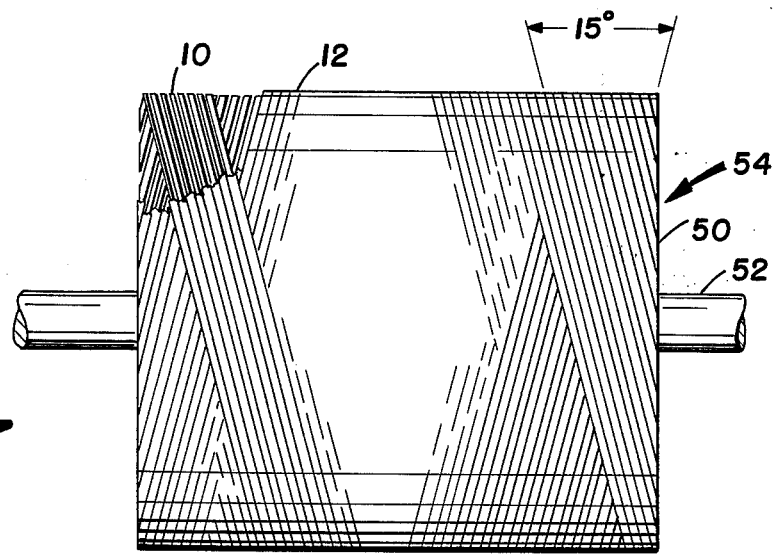

In such a shaft wound configuration, it will usually be convenient to make use of the overlapping level-wind technique used extensively in the filament production industry. Referring to FIGS. 6 and 7, sheathed filamentary material 50 is wound at a slight angle to the plane normal to shaft 52, and this angle is reversed each time the end of the thus formed rim member 54 is reached. The included angle between the windings of one layer and the windings of an adjacent layer can be any value established as being necessary to form a stable structure without the requirement for special support structure at its ends. If this angle were 15°, which is often used in the industry, and which is illustrated particularly in FIG. 7, then the loss in apparent strength of the filamentry material 50 is less than 1% (i.e., one minus the cosine of 7.5° = 0.99145). Materials useful with this particular structure include Kevlar, metal wire. Nylon, Dacron, low grade fiberglass, etc., the filamentary material 50 being sheathed with elastomeric material as described above.

The material useful for forming the resilient sheath 12 can comprise a variety of elastomeric and other resilient materials which are well-known. For example, any natural or synthetic rubber including silicone rubber, Neoprene, etc. would be suitable. Also useful would be polyurethane, polypropylene, and other resilient polymers in a foamed form or otherwise. It is only necessary to point out that material must be resilient and not susceptible to a permanent set on deformation.

Similarly, discrete concentric rings may also be used to form the present rotors, ring stretch being thereby accommodated during rotation. Of partiuclar note, the present structures can be fabricated with ballast material between the rings or wound portions therof. However, ballast is not required for successful operation, its use merely reducing cost and rotor volume. Ballast, disposed between the windings or rings can be used in any desired fraction from zero to 100% of a designed maximum, being that situation where all rings or windings are spinning at the same tensile stress level. The amount of ballast should vary inversely with the square of the radius of the rotor ring as is well-known in the art.

It is to be understood that the invention can be practiced other than as described hereinabove, the scope of the invention being limited only by the appended claims.

What is claimed is:

1. An inertial energy storage device for rotation about a shaft comprising, in combination,
   rotor means comprised of a plurality of annular rim elements formed of essentially anisotropic material having substantial tensile strength along longitudinal axes thereof; and,
   a layer of resilient material formed over full surface areas of the annular rim elements, surface portions of the layer covering adjacent rim elements being deformed toward the centers of the rim elements at least prior to rotation of the rotor means.

2. The inertial energy storage device of claim 1 wherein the layer of resilient material comprises a sheath of elastomeric material, the sheath essentially conforming to the shape of the annular rim elements, the layer of resilient material being thin relative to the diameter of the annular rim elements.

3. The inertial energy storage device of claim 1 and further comprising:
   hub means for carrying the rotor means, the hub means being attached to the shaft.

4. The inertial energy storage device of claim 1 wherein said rim elements are formed of fiber composite material.

5. The inertial energy storage rotor device of claim 1 wherein said rim elements comprise filament windings.

6. The inertial energy storage rotor device of claim 1 wherein said rim elements are discrete rings.

7. The inertial energy storage device of claim 1 wherein the rim element comprise filament windings, windings beginning at the inner periphery of the rotor means and extending to the outer periphery thereof being wound back inwardly toward the shaft to a point of termination.

8. The inertial energy storage device of claim 7 wherein the point of termination lies on the inner periphery of the rim means.

9. The inertial energy storage device of claim 1 wherein certain of the rim elements are disposed within the rotor means at an angle to a plate normal to the shaft.

10. The inertial energy storage device of claim 9 wherein certain other rim elements are disposed at an equal angle to a plane normal to the shaft as said first-mentioned rim elements,
    lines along which the second-mentioned rim elements extend having the negative slope of the lines along which the firstmentioned rim elements extend.

11. The inertial energy storage device of claim 10 wherein the first and second-mentioned rim elements lie alternately in successive layers extending radially from the shaft.

12. An inertial energy storage device for rotation about a shaft comprising, in combination,
    rotor means comprised of a plurality of annular rim elements formed of essentially anisotropic material having substantial tensile strength along longitudinal axes thereof, the rim elements comprising filament windings, the windings beginning at the inner periphery of the rotor means to the outer periphery thereof being wound back inwardly toward the shaft to a point of termination; and,
    resilient means formed over surface portions of the annular rim elements.

13. The inertial energy storage device of claim 12 wherein the point of termination lies on the inner periphery of the rotor means.

* * * * *

UNITED STATES PATENT OFFICE
CERTIFICATE OF CORRECTION

Patent No. 4,023,437          Dated   May 17, 1977

Inventor(s)  David W. Rabenhorst

It is certified that error appears in the above-identified patent and that said Letters Patent are hereby corrected as shown below:

Claim 7, line 2, "element" should read -- elements --.

Claim 12, line 8, after "means" insert -- and extending --.

Signed and Sealed this

Sixth Day of September 1977

[SEAL]

Attest:

RUTH C. MASON
Attesting Officer

LUTRELLE F. PARKER
Acting Commissioner of Patents and Trademarks